W. F. YOUNG.
BRAKE FOR CASTERS.
APPLICATION FILED FEB. 2, 1909.
918,636.
Patented Apr. 20, 1909.
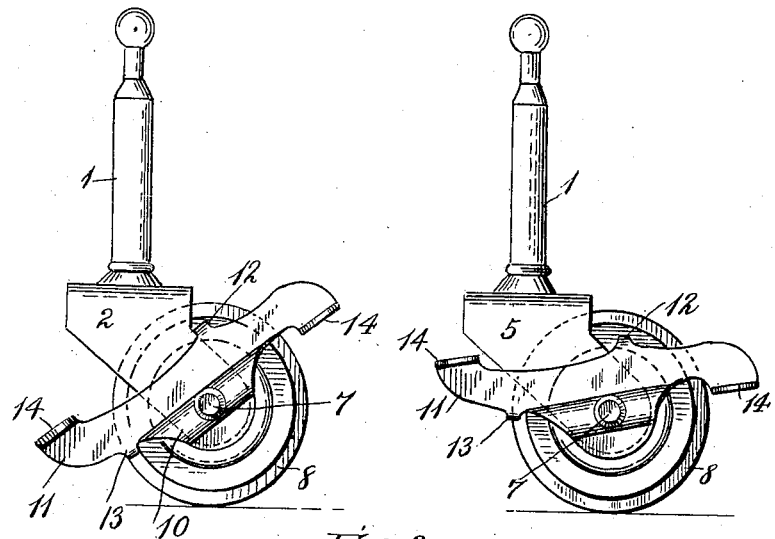
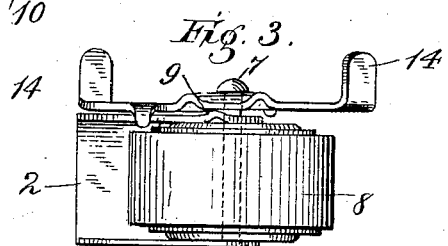
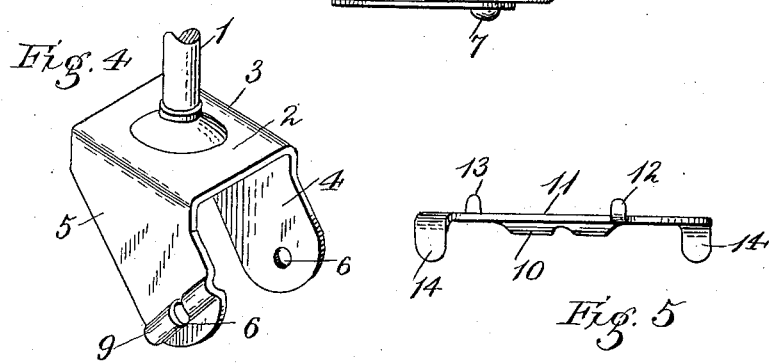
Witnesses
F. L. Ourand.
R. R. Duffie.
Inventor
Wm. F. Young.
By John S. Duffie.
Attorney

UNITED STATES PATENT OFFICE.

WILLIAM F. YOUNG, OF DETROIT, MICHIGAN, ASSIGNOR TO FAULTLESS CASTER COMPANY, OF NEBRASKA CITY, NEBRASKA.

BRAKE FOR CASTERS.

No. 918,636.      Specification of Letters Patent.      Patented April 20, 1909.

Application filed February 2, 1909. Serial No. 475,671.

*To all whom it may concern:*

Be it known that I, WILLIAM F. YOUNG, a citizen of the United States, residing at Detroit, in the county of Wayne and State of Michigan, have invented certain new and useful Improvements in Brakes for Casters, of which the following is a specification.

My invention has relation to brakes for casters and its object is to hold the caster wheel securely against rotation.

It consists of the novel construction and arrangement of parts as are set forth in the following specification, the virtue of my invention being specifically pointed out in the appended claims.

It is believed that the broad idea of a brake for a caster is new, the construction of which is illustrated in the accompanying drawings forming a part of this specification, like numerals designating like parts throughout the several views.

Reference being had to the said drawings, which are for illustrative purposes only and therefore not drawn to scale, Figure 1 is a side elevation, showing the brake in unlocked position. Fig. 2 is a side elevation illustrating the brake in partially locked position. Fig. 3 is a bottom view, showing the brake in locked position. Figs. 4 and 5 are details.

My invention is described as follows: The pintle 1, has the frame 2, rotatably mounted at its lower end in the usual manner. Said frame 2, is composed of a substantially rectangular base 3, having two ears 4 and 5, extending downwardly therefrom and integral therewith. Each of said ears is provided with a perforation 6, wherethrough passes the spindle 7, upon which rotates the caster wheel 8. One of said ears is provided with a ridge 9, which registers with a ridge 10, of said brake 11, when said brake is in unlocked position. Said brake is provided with two limiting lugs 12 and 13. When said lug 12, comes into contact with the edge of said ear 5, said brake is in unlocked position. When said lug 13, comes into contact with said ear 5, said brake is in locked position.

The two extreme positions that this brake may assume are illustrated in Figs. 1 and 3. The intermediate position is shown in Fig. 2, in which figure the brake is shown sufficiently in a horizontal position that the wheel 8, is actually held against rotation, but yet said lug 13, is not contacting said ear 5, as shown and heretofore pointed out in Fig. 3. The caster wheel 8, is held against rotation on account of the ear 5, binding against the outer side face thereof when said ridges 9 and 10, are not registering. When said ridges are registering, the resiliency existing in said ear 5, causes it to spring outward releasing said wheel so that it might rotate upon its spindle. Said spindle is provided with substantial heads adapting it to bear the strain which will be necessarily exerted upon it. Said brake 11, is provided with extensions 14, to facilitate in the manipulation of the same.

Although I have specifically described the construction and operation of my device, I may exercise the right to make such slight alterations in the construction as do not depart from the spirit of my invention or do not fall without the scope of the claims hereunto attached. It is obvious that the necessity for slight changes as to detail may arise in the manufacture of my device.

What I claim as new is:

1. A caster comprising a frame, said frame comprising a brake pivotally secured to the spindle of said caster.

2. A caster comprising a frame, said frame comprising two ears one of which is provided with a ridge, a caster wheel rotating between said ears upon a suitable spindle extending through suitable perforations in said ears, a brake provided with a ridge, said ridge registering with the ridge upon one of said ears when said brake is in unlocked position, said ridge extending at an angle from said ridge upon said ear when said brake is in locked position.

3. A brake comprising a frame, said frame having two ears one of which is provided with a ridge, a caster wheel rotatably mounted between said ears, a brake provided with a between said ears, a brake provided with a ridge normally registering with said firstmentioned ridge, said brake adapted to bind said ears against the outer side faces of said wheel when it is desired to hold said wheel against rotation, said brake provided with inwardly extending limiting lugs and outwardly projecting extensions, said extensions for the manipulation of the same.

In testimony whereof I affix my signature, in presence of two witnesses.

WILLIAM F. YOUNG.

Witnesses:
JOHN W. GOODSON,
REID DUGGAN.